United States Patent
Yu et al.

(10) Patent No.: US 11,474,649 B2
(45) Date of Patent: Oct. 18, 2022

(54) TOUCH SENSOR AND MANUFACTURING METHOD THEREOF

(71) Applicant: TPK Advanced Solutions Inc., Fujian (CN)

(72) Inventors: Chien Hsien Yu, Hsinchu County (TW); Zi Jun Ding, Fujian Province (CN); Qin Xue Fang, Xiamen (CN); Yun Guo Xu, Fuzhou (CN); Li De Lv, Xiamen (CN)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/192,937

(22) Filed: Mar. 5, 2021

(65) Prior Publication Data

US 2022/0283668 A1 Sep. 8, 2022

(51) Int. Cl.
*G06F 3/044* (2006.01)

(52) U.S. Cl.
CPC .. *G06F 3/0443* (2019.05); *G06F 2203/04103* (2013.01)

(58) Field of Classification Search
None
See application file for complete search history.

(56) References Cited

U.S. PATENT DOCUMENTS

| | | | | |
|---|---|---|---|---|
| 10,697,919 | B2* | 6/2020 | Tsai | G01N 27/127 |
| 11,099,703 | B1* | 8/2021 | Chan | G06F 3/044 |
| 2017/0242543 | A1* | 8/2017 | Chan | G06F 3/0445 |
| 2018/0335874 | A1* | 11/2018 | Li | G06F 3/047 |
| 2019/0064968 | A1* | 2/2019 | Liu | G06F 3/04164 |
| 2020/0012372 | A1* | 1/2020 | Chang | G03F 7/16 |
| 2020/0272263 | A1* | 8/2020 | Hsiao | G06F 3/0443 |
| 2021/0157447 | A1* | 5/2021 | Tsai | G06F 3/0446 |
| 2022/0075463 | A1* | 3/2022 | Tsai | G06F 3/04164 |

FOREIGN PATENT DOCUMENTS

| | | |
|---|---|---|
| JP | 2010257442 A | 11/2010 |
| JP | 2012519897 A | 8/2012 |
| JP | 2013214173 A | 10/2013 |
| JP | 2019153289 A | 9/2019 |
| JP | 2020155119 A | 9/2020 |
| TW | M563005 U | 7/2018 |

* cited by examiner

*Primary Examiner* — Duane N Taylor, Jr.
(74) *Attorney, Agent, or Firm* — Cooper Legal Group, LLC (57) ABSTRACT

A touch sensor having a visible area and a peripheral area on at least one side of the visible area includes a substrate, a metal nanowire layer, and a metal layer. The metal nanowire layer is disposed on the substrate and has a first portion corresponding to the visible area and a second portion corresponding to the peripheral area. The metal layer is disposed on the second portion of the metal nanowire layer and has at least one extending portion extending into the visible area, in which the extending portion overlaps the first portion of the metal nanowire layer.

9 Claims, 8 Drawing Sheets

TOUCH SENSOR AND MANUFACTURING METHOD THEREOF

BACKGROUND

Field of Disclosure

The present disclosure relates to a touch sensor and a manufacturing method of a touch sensor.

Description of Related Art

In recent years, touch sensors have been widely used in portable electronic products such as mobile phones, notebook computers, satellite navigation systems, and digital audio-visual players to serve as information communication channels between users and electronic devices.

A touch sensor includes touch electrodes and peripheral circuits, and the touch electrodes and the peripheral circuits are usually overlapped with each other in the peripheral area to form a conductive path or loop, in which the overlapping impedance will affect the overlapping stability, which actually affects the signal transmission and the response rate of the touch sensor. An overlapping area between the touch electrodes and the peripheral circuits is a factor which determines the overlapping impedance. Generally, the overlapping impedance becomes lower when the overlapping area becomes larger. However, the overlapping area will directly affect the size of the peripheral area of the touch sensor. In addition, when metal nanomaterials are adopted as being the materials of the touch electrodes, the surface resistance of the metal nanomaterials is relatively greater than the surface resistance of other common materials due to the material characteristics of the metal nanomaterials, which gives a more obvious impact on the overlapping stability.

As demands for narrow bezel products gradually increase, a touch sensor which can not only meet the size requirements of the peripheral area, but also meet the requirements of the overlapping stability is currently worth studying.

SUMMARY

According to some embodiments of the present disclosure, a touch sensor having a visible area and a peripheral area on at least one side of the visible area includes a substrate, a metal nanowire layer, and a metal layer. The metal nanowire layer is disposed on the substrate and has a first portion corresponding to the visible area and a second portion corresponding to the peripheral area. The metal layer is disposed on the second portion of the metal nanowire layer and has at least one extending portion extending into the visible area, in which the extending portion overlaps the first portion of the metal nanowire layer.

In some embodiments of the present disclosure, the extending portion extends into the visible area from a boundary between the peripheral area and the visible area.

In some embodiments of the present disclosure, an extending length of the extending portion extending in the visible area is at least 0.05 mm.

In some embodiments of the present disclosure, the extending portion extends along a first direction, a width of the extending portion along a second direction is between 0.006 mm and 0.050 mm, and the second direction is perpendicular to the first direction.

In some embodiments of the present disclosure, the first portion of the metal nanowire layer constitutes at least one touch sensing electrode, the touch sensing electrode includes at least one electrode line extending along a first direction, a width of the electrode line along a second direction is between 200 μm and 400 μm, and the second direction is perpendicular to the first direction.

In some embodiments of the present disclosure, the extending portion extends above an entirety of the electrode line, the extending portion has two ends in the visible area along the first direction, the electrode line has two ends in the visible area along the first direction, and the two ends of the extending portion are substantially aligned with the two ends of the electrode line.

In some embodiments of the present disclosure, an extending pattern of the extending portion is conformal to an electrode pattern of the electrode line.

In some embodiments of the present disclosure, an extending pattern of the extending portion is a continuously extending linear pattern, wave pattern, or combinations thereof.

In some embodiments of the present disclosure, an extending pattern of the extending portion is constituted by a plurality of line segments disposed at intervals.

In some embodiments of the present disclosure, the metal layer has a plurality of the extending portions, the touch sensing electrode includes a plurality of the electrode lines, and the extending portions are disposed corresponding to positions of the electrode lines, respectively.

In some embodiments of the present disclosure, the second portion of the metal nanowire layer and the metal layer disposed on the second portion together constitute a peripheral circuit.

According to some other embodiments of the present disclosure, a manufacturing method of a touch sensor having a visible area and a peripheral area on at least one side of the visible area includes: providing a substrate; forming a metal nanowire material layer on the substrate; forming a metal material layer on the metal nanowire material layer; performing a first patterning step, such that a metal layer is formed; and performing a second patterning step, such that a metal nanowire layer is formed. The first patterning step includes: patterning a portion of the metal material layer corresponding to the peripheral area, such that a portion of the metal layer is formed; and patterning a portion of the metal material layer corresponding to the visible area, such that an extending portion extending into the visible area from the portion of the metal layer is formed. The second patterning step includes: patterning a portion of the metal nanowire material layer corresponding to the visible area, such that a first portion of the metal nanowire layer is formed, and the extending portion of the metal layer overlaps the first portion of the metal nanowire layer; and patterning a portion of the metal nanowire material layer corresponding to the peripheral area, such that a second portion of the metal nanowire layer is formed.

In some embodiments of the present disclosure, the portion of the metal material layer corresponding to the peripheral area and the portion of the metal material layer corresponding to the visible area are patterned in a same process.

In some embodiments of the present disclosure, the portion of the metal nanowire material layer corresponding to the peripheral area and the portion of the metal nanowire material layer corresponding to the visible area are patterned in a same process.

In some embodiments of the present disclosure, the portion of the metal material layer corresponding to the visible area is patterned according to a first predetermined pattern, the portion of the metal nanowire material layer corresponding to the visible area is patterned according to a second predetermined pattern, and the first predetermined pattern is corresponding to the second predetermined pattern.

In some embodiments of the present disclosure, the first predetermined pattern is conformal to the second predetermined pattern.

According to the aforementioned embodiments of the present disclosure, the touch sensor of the present disclosure has a metal layer located in the peripheral area, and since the metal layer has at least one extending portion extending into the visible area, and the extending portion overlaps and contacts the metal nanowire layer located in the visible area, the contact area between the metal layer and the metal nanowire layer can be effectively increased, which not only improves the electrical contact stability between the metal layer and the metal nanowire layer, but also effectively reduces the surface resistance of the touch sensor to improve the conductivity of the touch sensor, so as to reduce the resistive capacitive loading (RC Loading) of the touch sensor. In addition, a single process can be performed to the visible area and the peripheral area on the entire surface in the manufacturing method of the touch sensor, such that the entire metal nanowire material layer and the entire metal material layer are patterned. Accordingly, a peripheral circuit layered by the metal layer and the metal nanowire layer is formed in the peripheral area, and a touch sensing electrode with the metal layer assisted by the metal nanowire layer is formed in the visible area. As such, the conventional structural design which requires a single metal layer to align with the touch sensing electrode in the peripheral area can be omitted, and the alignment tolerance error generated during the overlapping process can be completely avoided, thereby meeting the design requirement for the product with narrow bezel.

BRIEF DESCRIPTION OF THE DRAWINGS

The disclosure can be more fully understood by reading the following detailed description of the embodiments, with reference made to the accompanying drawings as follows:

FIG. 10 is a partial enlargement view illustrating the region R1 of the touch sensor in FIG. 1A;

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

It should be understood that although the terms "first", "second", and "third" may be used herein to describe various elements, components, regions, layers, and/or portions, these elements, components, regions, layers, and/or portions should not be restricted by these terms. These terms are only used to distinguish one element, component, region, layer, or portion from another element, component, region, layer, or portion. Therefore, the "first element", "component", "region", "layer", or "portion" described below can also be referred to as a second element, component, region, layer, or portion without departing from the teachings the present disclosure.

In addition, relative terms such as "lower" or "bottom" and "upper" or "top" can be used herein to describe the relationship between one element and another element, as shown in the figures. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

Figure 1A:
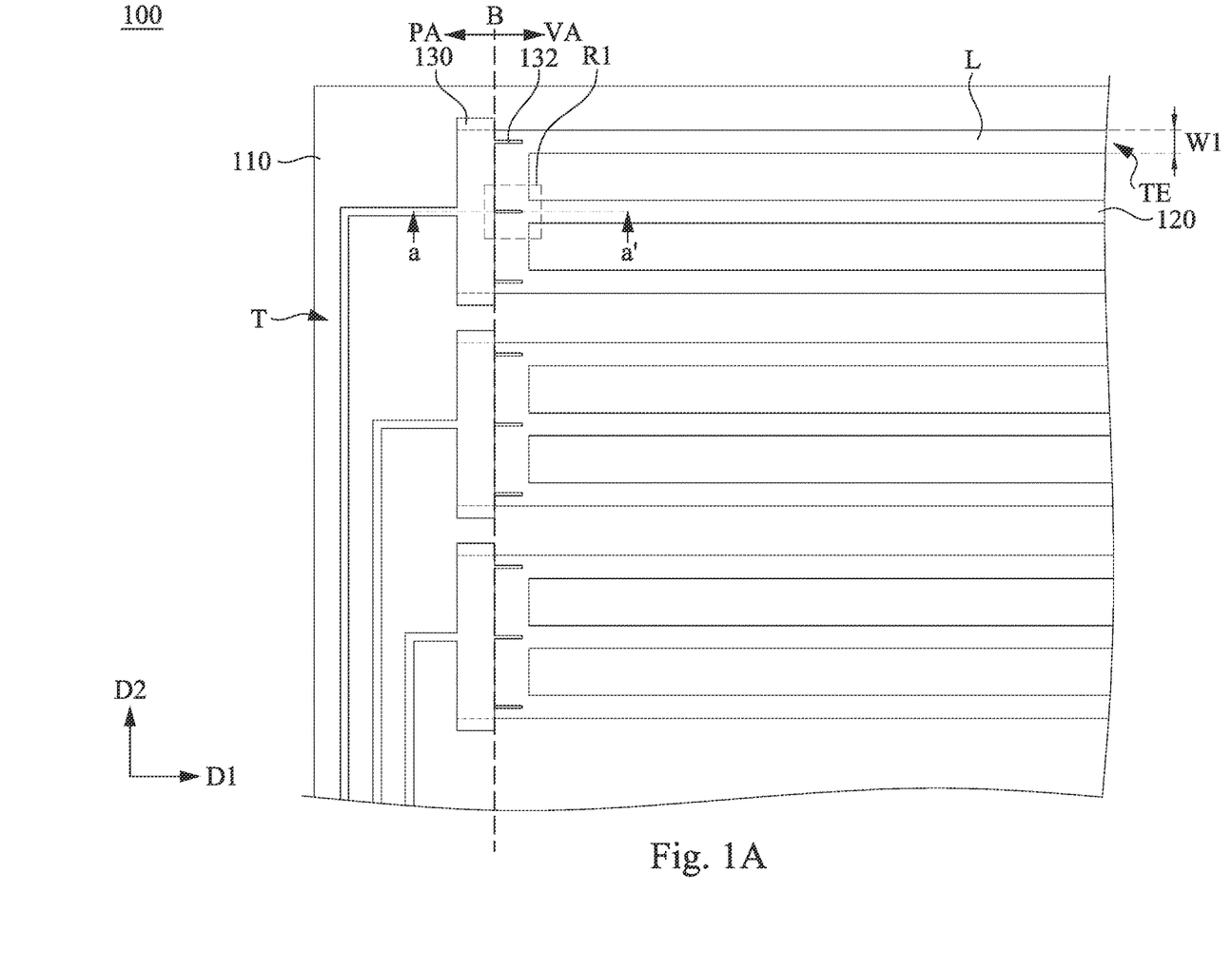
FIG. 1A is a top view illustrating a touch sensor according to some embodiments of the present disclosure.
Figure 1B:
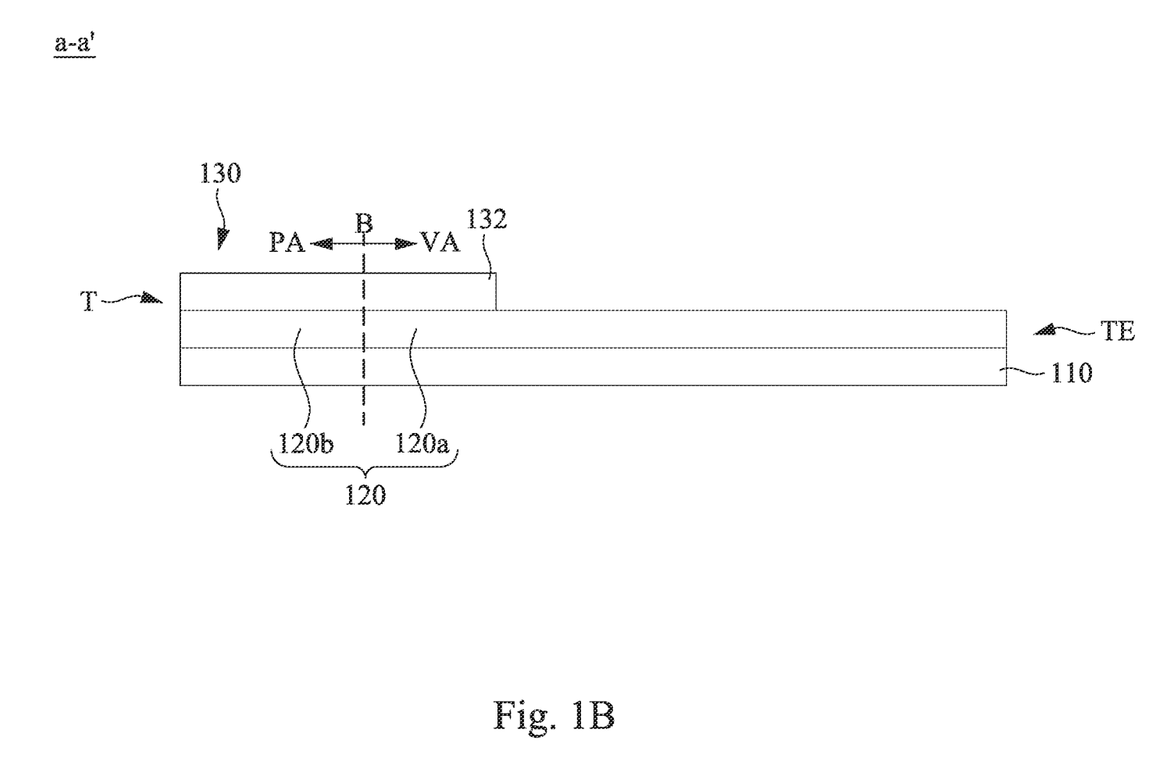
FIG. 1B is a cross-sectional view illustrating the touch sensor in FIG. 1A taken along line a-a'.

FIG. 1A is a top view illustrating a touch sensor 100 according to some embodiments of the present disclosure. FIG. 1B is a cross-sectional view illustrating the touch sensor 100 in FIG. 1A taken along line a-a'. Reference is made to FIG. 1A and FIG. 1B. The touch sensor 100 has a visible area VA and a peripheral area PA, and the peripheral area PA is disposed on the sides of the visible area VA. For example, the peripheral area PA may be a frame-shaped area disposed around (i.e., including the right, left, upper, and lower sides of) the visible area VA. As another example, the peripheral area PA may also be an L-shaped area disposed on the left and lower sides of the visible area VA. The touch sensor 100 includes a substrate 110, a metal nanowire layer 120, and a metal layer 130, and the metal nanowire layer 120 and the metal layer 130 are sequentially disposed on the substrate 110. The substrate 110 is configured to support the metal nanowire layer 120 and the metal layer 130, and may be, for example, a rigid transparent substrate or a flexible transparent substrate. In some embodiments, a material of the substrate 110 includes, but is not limited to, transparent materials such as glass, acrylic, polyvinyl chloride, cycloolefin polymer, cycloolefin copolymer, polypropylene, polystyrene, polycarbonate, polyethylene terephthalate, polyethylene naphthalate, colorless polyimide, or combinations thereof.

In some embodiments, the metal nanowire layer 120 has a first portion 120a corresponding to the visible area VA and a second portion 120b corresponding to the peripheral area PA, in which the first portion 120a of the metal nanowire layer 120 constitutes a touch sensing electrode TE, and the second portion 120b of the metal nanowire layer 120 and the metal layer 130 located in the peripheral area PA together constitute a peripheral circuit T. In some embodiments, the touch sensing electrode TE may include at least one strip-shaped electrode line L (also referred to as electrode line L hereinafter) extending along a first direction D1. In this embodiment, three electrode lines L are taken as an example. The three electrode lines L are connected in parallel at their ends to form a touch sensing electrode TE, and the three electrode lines L can be disposed at intervals along a second direction D2, in which the second direction D2 is perpendicular to the first direction D1. In some embodiments, a width W1 of the electrode line L along the second direction D2 is between 200 µm and 400 µm, such that the visibility, reliability, and performance of the touch sensing electrode TE can all be satisfied. In detail, when the width W1 of the electrode line L is greater than 400 µm, the touch sensing electrode TE may have problems with the visibility, and the capacitance in mutual capacitance sensing may be too large to meet the sensing requirements, resulting in poor performance; when the width W1 of the electrode line L is less than 200 μm, the touch sensing electrode TE may be less likely to pass reliability tests, and the surface resistance is greater due to a smaller width W1, which is not conducive to sensing. On the other hand, the electrode line L within the aforementioned width range is more advantageous to the configuration of the extending portion 132 of the present disclosure, which will be described in more detail below.

In some embodiments, the metal nanowire layer 120 may include a matrix and a plurality of metal nanowires (also called metal nanostructures) distributed in the matrix. The matrix may include polymers or mixtures thereof to impart specific chemical, mechanical, and optical properties to the metal nanowires. For example, the matrix can provide good adhesion between the metal nanowires and the substrate 110. As another example, the matrix can also provide good mechanical strength for the metal nanowires. In some embodiments, the matrix may include a specific polymer, such that the metal nanowires have additional scratch/wear-resistant surface protection, thereby improving the surface strength of the metal nanowire layer 120. The foregoing specific polymer may be, for example, polyacrylate, epoxy resin, polyurethane, polysiloxane, polysilane, poly (silicon-acrylic acid), or combinations thereof. In some embodiments, the matrix may further include a surfactant, a cross-linking agent, a stabilizer (including but not limited to, for example, an antioxidant or an ultraviolet stabilizer), a polymerization inhibitor, or combinations of any of the foregoing ingredients, in order to improve the ultraviolet resistance of the metal nanowire layer 120 and prolong its service life.

It should be understood that the term "metal nanowire" used herein is a collective noun, which refers to a collection of metal wires that include multiple metal elements, metal alloys, or metal compounds (including metal oxides), and the number of metal nanowires included therein does not affect the scope of the present disclosure. In some embodiments, a cross-sectional size (e.g., a diameter of the cross section) of a single metal nanowire can be less than 500 nm, preferably less than 100 nm, and more preferably less than 50 nm. In some embodiments, the metal nanowire has a large aspect ratio (i.e., length:diameter of the cross section). Specifically, the aspect ratio of the metal nanowire may be between 10 and 100,000. In more detail, the aspect ratio of the metal nanowire may be greater than 10, preferably greater than 50, and more preferably greater than 100. Moreover, other terms such as silk, fiber, or tube also have the aforementioned cross-sectional dimensions and aspect ratios, which also fall within the scope of the present disclosure.

In some embodiments, the metal layer 130 is disposed on the second portion 120b of the metal nanowire layer 120, and the metal layer 130 and the second portion 120b of the metal nanowire layer 120 together constitute the peripheral circuit T. The peripheral circuit T can be connected to an external controller for touch or other signal transmission. By forming the peripheral circuit T by at least a portion of the metal nanowire layer 120 and at least a portion of the metal layer 130, the metal nanowire layer 120 can be electrically in contact with the metal layer 130 through the entire peripheral circuit T to provide better signal transmission. In some embodiments, a highly conductive material may be adopted to form the metal layer 130, for example, copper or silver can be adopted as being the material of the metal layer 130. In addition, compared to the conventional structure in which the peripheral circuit of a single metal layer is used to align with the touch sensing electrode in the peripheral area, the touch sensor 100 of the present disclosure can completely avoid the alignment tolerance error generated during the overlapping process with the design of the present disclosure, such that there is no need for reserving any area for the alignment tolerance error in the peripheral area PA, thereby meeting the design requirement for the product with narrow bezel.

In some embodiments, the metal layer 130 has an extending portion 132 that extends into the visible area VA, and the extending portion 132 overlaps and contacts the first portion 120a of the metal nanowire layer 120. That is, the extending portion 132 overlaps and contacts the touch sensing electrode TE to provide electrical auxiliary effect. In some embodiments, the extending portion 132 extends into the visible area VA from a boundary B between the visible area VA and the peripheral area PA.

On the other hand, the extending portion 132 of the metal layer 130 and the remaining portion of the metal layer 130 (e.g., the portion of the metal layer 130 located in the peripheral area PA) may be integrally formed as a whole. That is, no substantial interface exists between the extending portion 132 of the metal layer 130 and remaining portion of the metal layer 130. Through the configuration of the extending portion 132, the metal layer 130 and the metal nanowire layer 120 can further make electrical contact with each other in the visible area VA, such that the contact area between the metal layer 130 and the metal nanowire layer 120 can further be increased. Accordingly, the surface resistance of the touch sensor 100 can be effectively reduced to improve the conductivity of the touch sensor 100, the resistive capacitive loading (RC Loading) of the touch sensor 100 can further be reduced, and the electrical contact stability between the entire metal layer 130 and the metal nanowire layer 120 can be increased. In some embodiments, when the touch sensing electrode TE includes a plurality of the electrode lines L, such as the three electrode lines L shown in FIG. 1A, the metal layer 130 may have a plurality of the extending portions 132, and the extending portions 132 may be disposed corresponding to the positions of the electrode lines L, respectively. In this case, the number of extending portions 132 may be identical to the number of electrode lines L. As such, the patterning of the electrode lines L and the extending portions 132 can be facilitated and the alignment of the electrode lines L and the extending portions 132 can be well achieved, thereby improving the convenience of the manufacturing process.

FIG. 10 is a partial enlargement view illustrating the region R1 of the touch sensor in FIG. 1A. Reference is made to FIG. 10. In some embodiments, an extending pattern of the extending portion 132 is a linear pattern, and the linear pattern extends along the first direction D1. An extending length L2 of the extending portion 132 extending in the visible area VA is least 0.05 mm, and preferably, for example, 2.00 mm. More specifically, the extending portion 132 extends along the first direction D1 and has an extending length L2 of at least 0.05 mm to thereby provide a sufficient contact area. It should be noted that when the extending pattern of the extending portion 132 is a linear pattern, the extending length L2 of the extending portion 132 is the length of the linear pattern in the first direction D1; when the extending pattern of the extending portion 132 is a non-linear pattern, the extending length L2 of the extending portion 132 is the shortest connection length between the two ends 132e of the non-linear pattern along the first direction D1 in the visible area VA. In detail, if the extending length L2 of the extending portion 132 is less than 0.05 mm, the extending portion 132 may not be able to properly and stably contact the metal nanowires randomly distributed in the touch sensing electrode TE, and the meaning of designing the extending portion 132 is lost. In some embodiments, a width W2 of the extending portion 132 along the second direction D2 may be between 0.006 mm and 0.050 mm, such that the optical property presented by the viewing area VA and the contact property between the extending portion 132 and the touch sensing electrode TE can both be satisfied. In detail, when the width W2 of the extending portion 132 along the second direction D2 is greater than 0.050 mm, the overlapping portion of the extending portion 132 and the touch sensing electrode TE may be easily seen (i.e., the overlapping portion has unnecessary visibility), thereby affecting the optical property presented by the visible area VA of the touch sensor 100; when the width W2 of the extending portion 132 along the second direction D2 is less than 0.006 mm, the extending portion 132 may not be stably in contact with the touch sensing electrode TE to provide electrical auxiliary effect, and difficulties with patterning the extending portion 132 are increased.

Since the extending portion 132 has a smaller width W2, in order to ensure the electrical contact stability between the extending portion 132 and the metal nanowire layer 120, in some embodiments, a metal nanowire layer 120 with a suitable surface resistance specification can further be selected. In more detail, the selection of the surface resistance specification of the metal nanowire layer 120 needs to consider the contact resistance between the metal nanowire layer 120 and the extending portion 132 as well as the optical property presented by the touch sensor 100. When a metal nanowire layer 120 with larger surface resistance is selected, the metal nanowires are sparse in the metal nanowire layer 120 and have a lower density, which will make it difficult for the metal nanowires to stably contact the extending portion 132, such that the contact resistance between the metal nanowire layer 120 and the extending portion 132 is excessively large; when a metal nanowire layer 120 with smaller surface resistance is selected, the metal nanowires are concentrated in the metal nanowire layer 120 and have a higher density, which will reduce the light transmission and affect the optical property. In some embodiments, the surface resistance specification of the metal nanowire layer 120 can be selected to be in a range from 10 Ohms per square (ops) to 100 ops, and preferably in a range from 35 ops to 70 ops, to satisfy the optical and electrical properties. As such, an electrical contact between the extending portion 132 and the metal nanowire layer 120 can be well formed, and the touch sensor 100 can exhibit a better optical property.

FIGS. 2 to 5 are top views illustrating some touch sensors according to some other embodiments of the present disclosure. It should be understood that the touch sensors of FIGS. 2 to 5 and the touch sensor 100 of FIG. 1A have substantially the same component configuration and connection relationships, materials, and advantages, which will not be repeated hereinafter, and only the differences will be discussed in the following descriptions.

Figure 2:
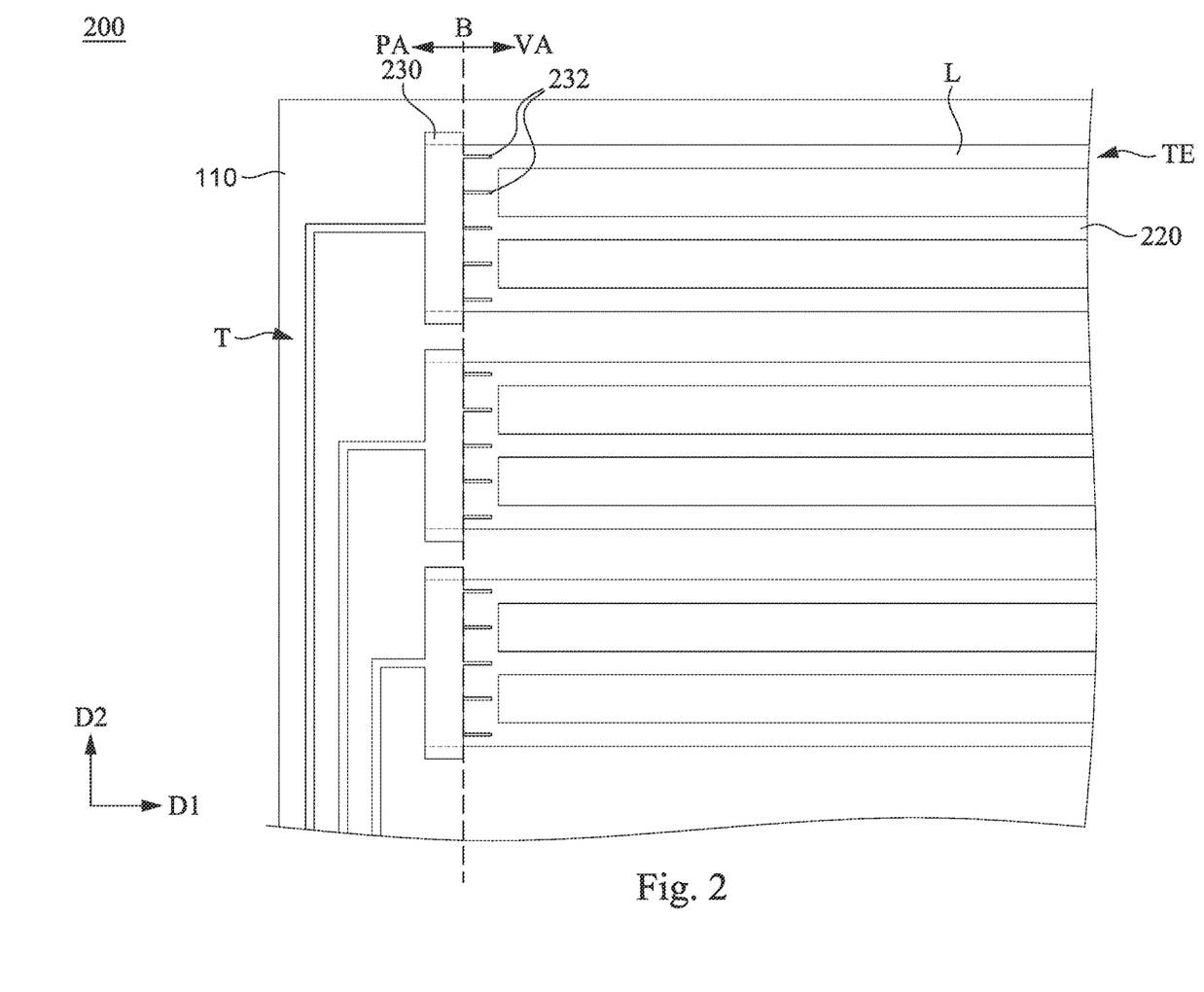
FIGS. 2 to 5 are top views illustrating some touch sensors according to some other embodiments of the present disclosure.

Reference is made to FIG. 2. At least one difference between the touch sensor 200 shown in FIG. 2 and the touch sensor 100 shown in FIG. 1A lies in that in the touch sensor 200, other extending portions 232 which are not disposed corresponding to the positions of the electrode lines L are further disposed between the extending portions 232 which are disposed corresponding to the positions of the electrode lines L. In other words, in the touch sensor 200, the extending portions 232 are disposed in a greater arrangement density along the second direction D2. That is, one touch sensing electrode TE has a larger number of extending portions 232 thereon per unit area. In some embodiments, one extending portion 232 which is not disposed corresponding to the position of the electrode line L is disposed between the two extending portions 232 which are disposed corresponding to the positions of the electrode lines L, and the extending portion 232 which is not disposed corresponding to the position of the electrode line L is disposed in the middle of the two extending portions 232 which are disposed corresponding to the positions of the electrode lines L along the second direction D2. That is, the extending portion 232 which is not disposed corresponding to the position of the electrode line L and the extending portions 232 which are disposed corresponding to the positions of the electrode lines L are equidistantly spaced at intervals along the second direction D2. Furthermore, the extending portion 232 which is not disposed corresponding to the position of the electrode line L is disposed in the middle of the two electrode lines L along the second direction D2. That is, the extending portion 232 which is not disposed corresponding to the position of the electrode line L and the electrode lines L are equidistantly spaced at intervals along the second direction D2. By appropriately increasing the number of extending portions 232, the contact area between the metal layer 230 and the metal nanowire layer 220 can further be increased, so as to better improve the electrical contact between the metal layer 230 and the metal nanowire layer 220.

Figure 3:
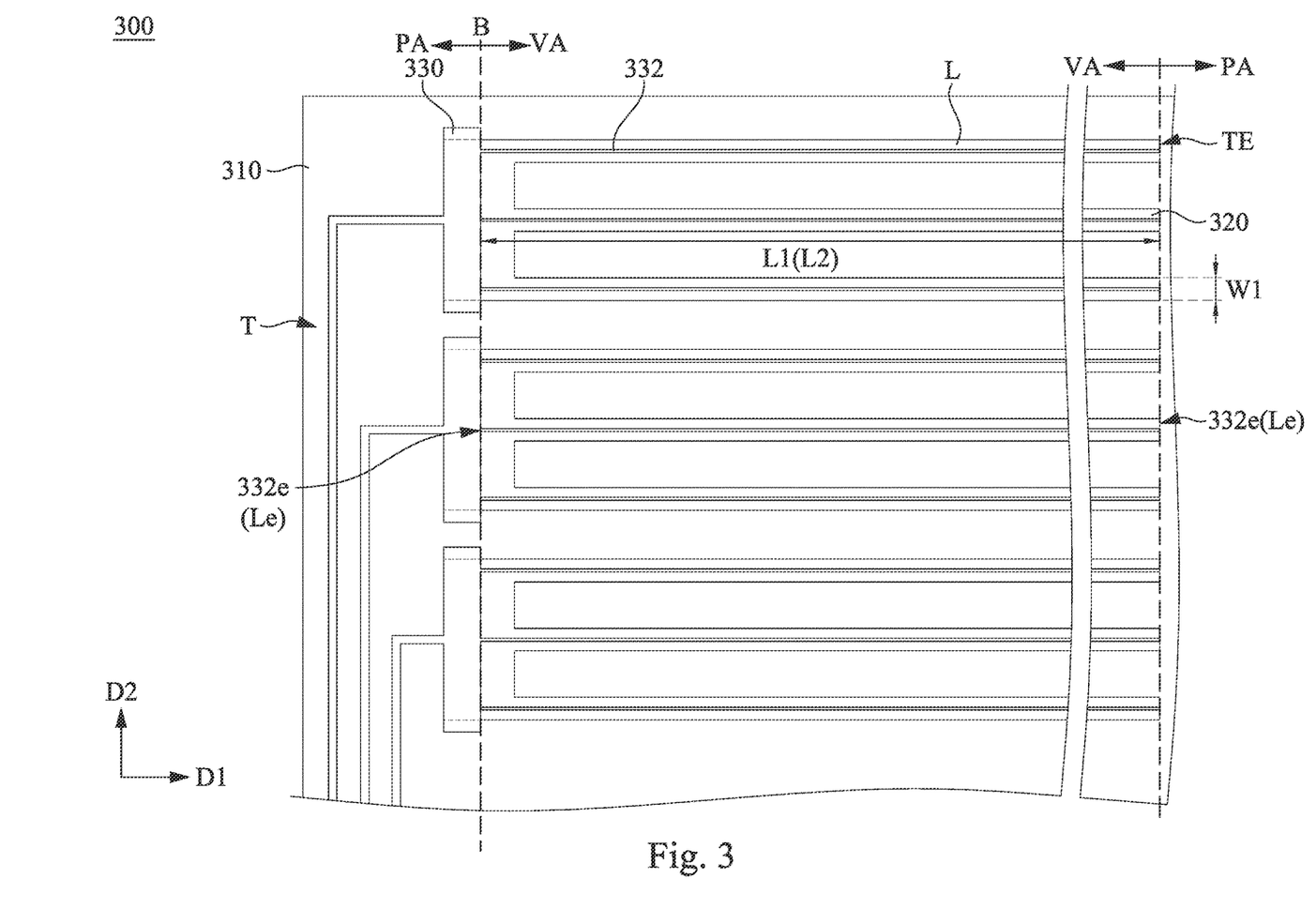

Reference is made to FIG. 3. At least one difference between the touch sensor 300 shown in FIG. 3 and the touch sensor 100 shown in FIG. 1A lies in that in the touch sensor 300, each extending portion 332 extends further along the first direction D1 above the entire electrode line L, such that the extending pattern of each extending portion 332 is a continuously extending linear pattern, and the extending length L2 of the extending portion 332 extending along the first direction D1 in the visible area VA is equal to extending length L1 of the electrode line L extending along the first direction D1 in the visible area VA. In other words, the extending portion 332 has two ends 332e in the visible area VA along the first direction D1, and the electrode line L has two ends Le in the visible area VA along the first direction D1, and the two ends 332e of the extending portion 332 and the two ends Le of the electrode line L are substantially aligned with each other on a plane formed by the first direction D1 and the second direction D2 (i.e., an extending plane of the substrate 310), in which the extending length L2 of the extending portion 332 refers to the shortest connection length between the two ends 332e of the extending portion 332, and the extending length L1 of the electrode line L refers to the shortest connection length between the two ends Le of electrode line L. Accordingly, each extending portion 332 can make contact with the entire electrode line L along the first direction D1, so as to further increase the contact area between the metal layer 330 and the metal nanowire layer 320, thereby improving the electrical contact between the metal layer 330 and the metal nanowire layer 320. More specifically, by lengthening the extending portion 332 with high conductivity to make electrical contact with the electrode line L, the line resistance of the electrode line L can be effectively reduced, so as to improve the conductivity of the electrode line L and further reduce the RC loading of the touch sensor 300. For example, in this embodiment, when the width W2 of the extending portion 332 is about 8 µm, the line resistance of the electrode line L assisted by the extending portion 332 is decreased by at least 45% compared to the conventional electrode line L without the assistance of the extending portion 332. In some other embodiments, the extending length L1 of the extending portion 332 can be set to be greater than the extending length L1 of the extending portion 132 in FIG. 1A and less than the extending length L1 of the extending portion 332 in FIG. 3 according to actual needs; such a length L1 can still improve the electrical contact stability, reduce the line resistance of the electrode line L, and reduce the RC loading of the touch sensor 300.

Figure 1C:
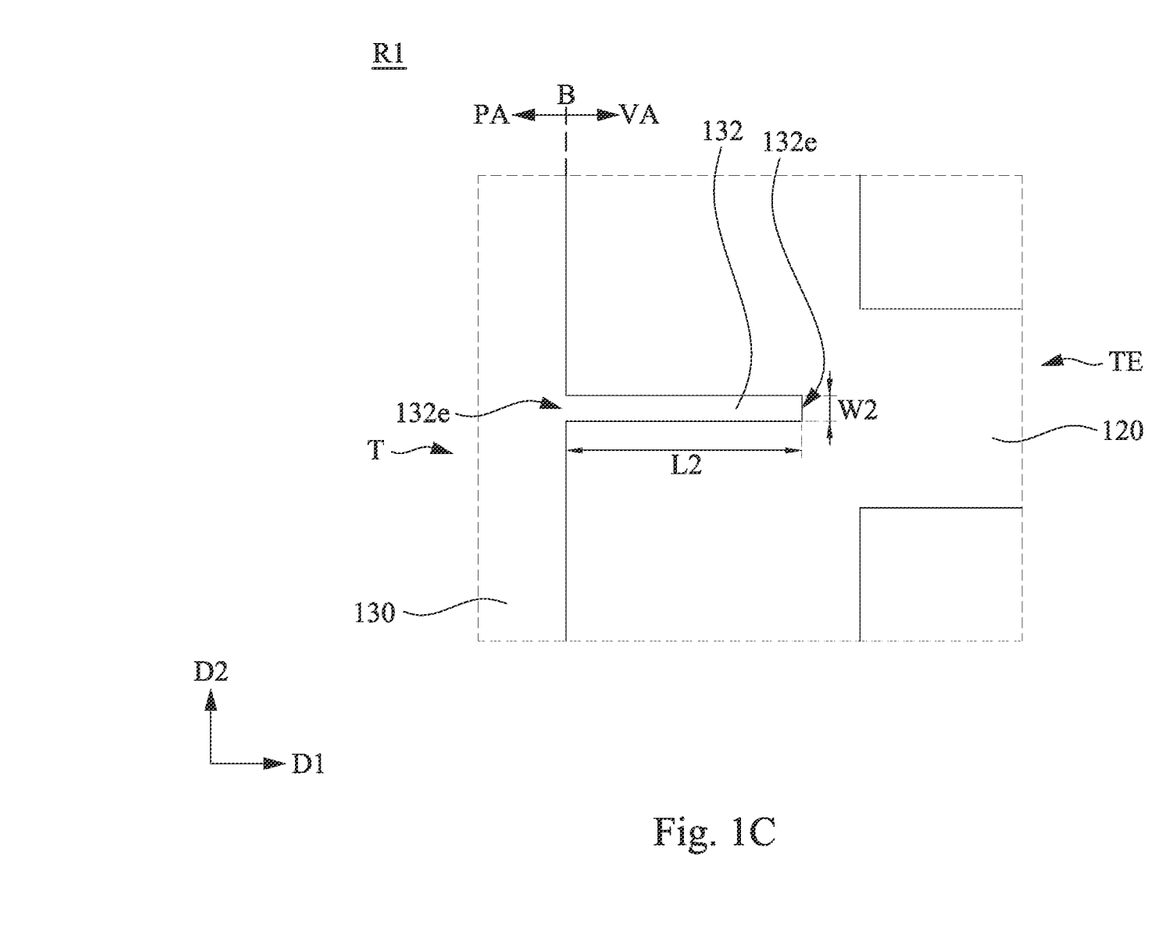

As described above, the width W1 of the electrode line L can facilitate the configuration of the extending portion 132/332. Specifically, since the width W1 of the electrode line L is much larger than the width W2 of the extending portion 132/332 (shown in FIG. 1C), even in the embodiment of FIG. 3 in which each extending portion 332 extends above the entire electrode line L, the optical property presented by the visible area VA will not be affected. In some embodiments, each extending portion 332 may be substantially parallel to the electrode line L in contact therewith. That is, the extending pattern of each extending portion 332 is a continuously extending linear (strip-shaped) pattern. As such, the alignment between the extending portion 332 and the electrode line L can be well achieved, so as to improve the convenience of the patterning process.

Figure 4:
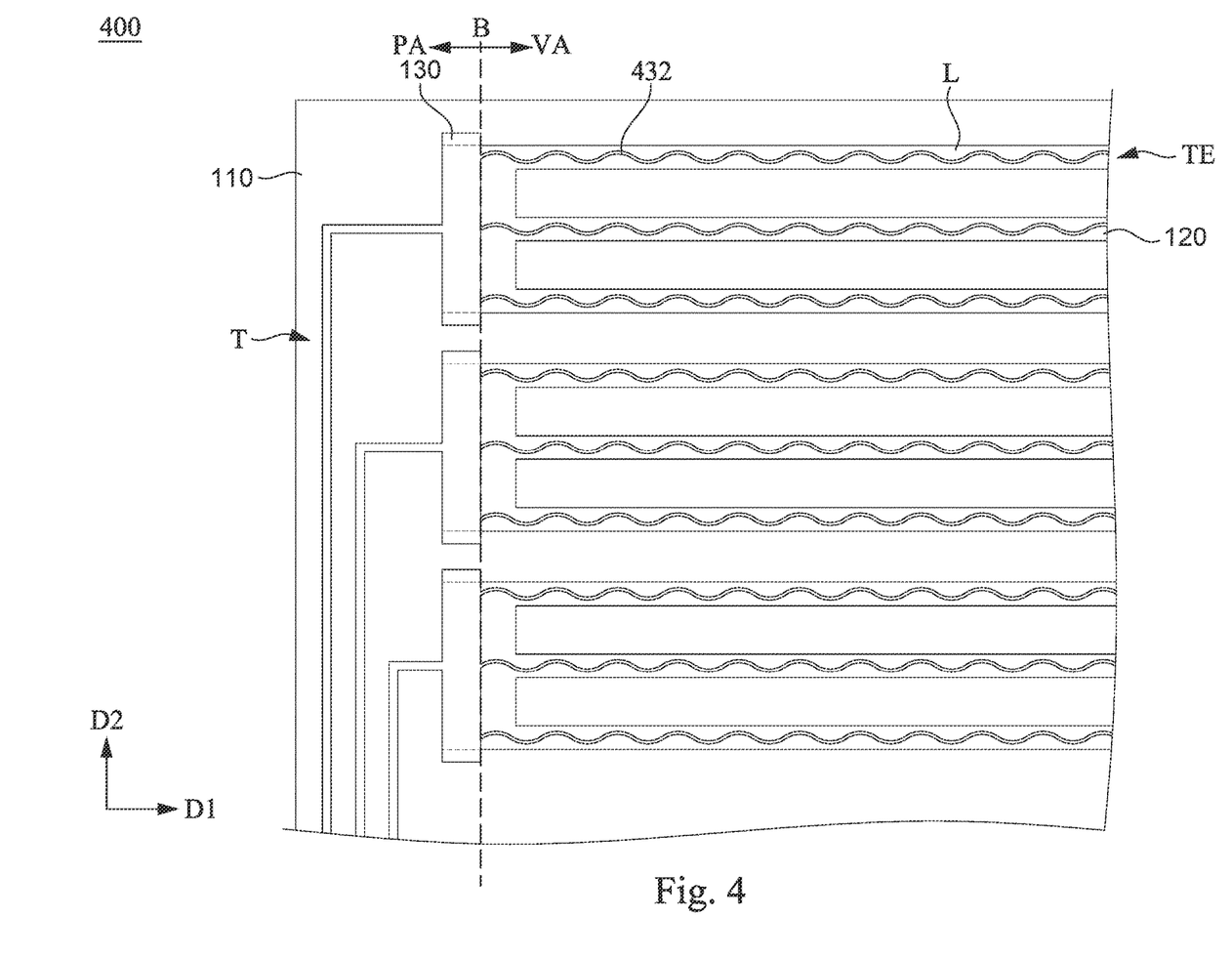

Reference is made to FIG. 4. At least one difference between the touch sensor 400 shown in FIG. 4 and the touch sensor 300 shown in FIG. 3 lies in that in the touch sensor 400, the extending pattern of each extending portion 432 is a continuous extending wave pattern. With such a configuration, the problem of moire generated by each extending portion 432 in the visible area VA can be avoided, such that the possibility of optical interference can be reduced. In some other embodiments, the wave pattern of the extending pattern of each extending portion 432 can be a sine wave pattern, a square wave pattern, a triangle wave pattern, a saw-tooth wave pattern, or combinations thereof. The aforementioned non-linear patterns can avoid the problem of moire to reduce the possibility of optical interference. In some other embodiments, the electrode pattern of the electrode line L may further be conformal to the extending pattern of the extending portion 432. That is, when the extending pattern of the extending portion 432 is a continuously extending wave pattern, the electrode pattern of the electrode line L may also be a continuously extending wave pattern, and the extending pattern of the extending portion 432 may extend along the electrode pattern of the electrode line L. It should be understood that the combination of the extending pattern of the extending portion 432 and the electrode pattern of the electrode line L is not limited thereto, and any possible combination of the extending pattern and the electrode pattern falls within the scope of the present disclosure.

Figure 5:
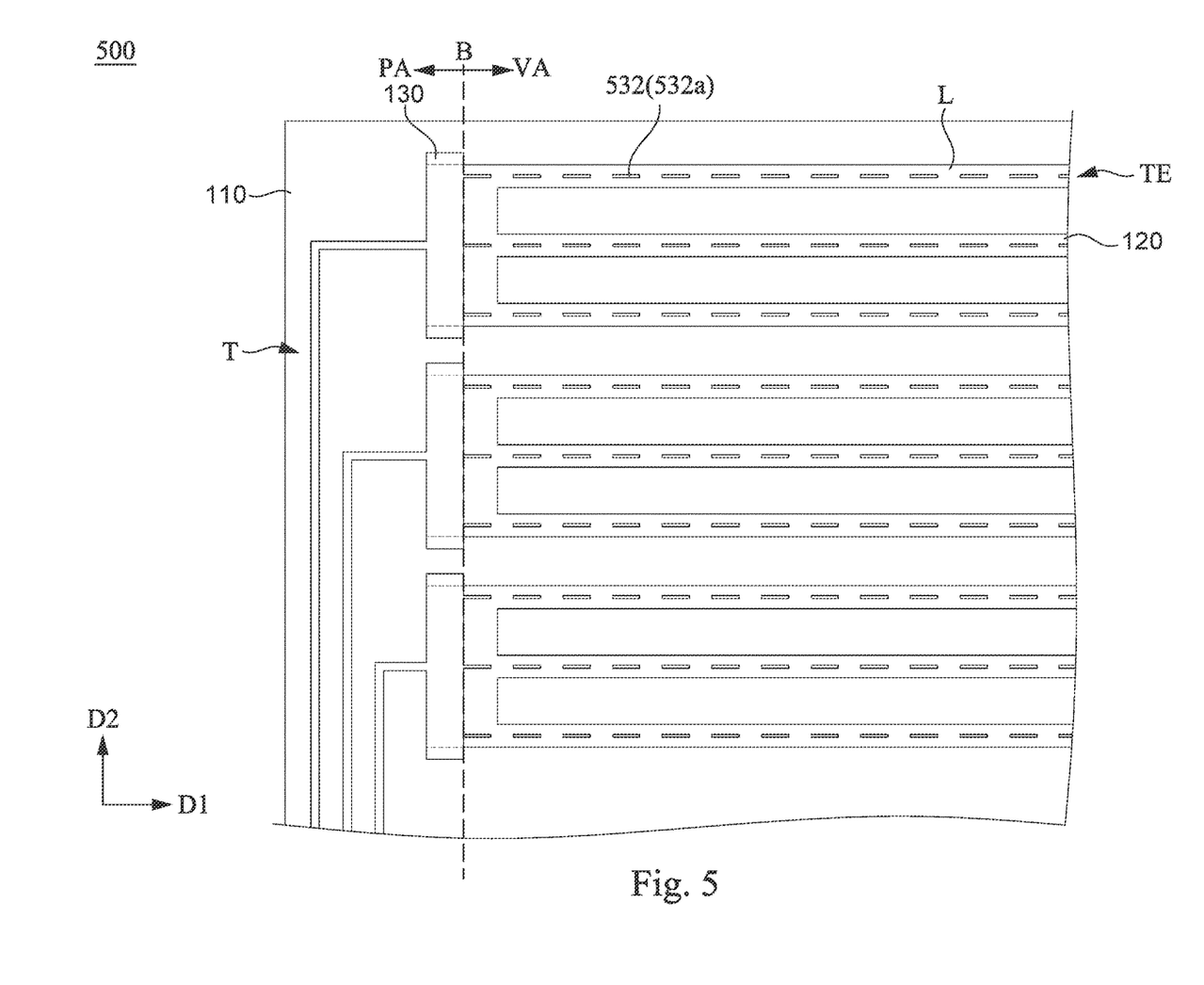

Reference is made to FIG. 5. At least one difference between the touch sensor 500 shown in FIG. 5 and the touch sensor 300 shown in FIG. 3 lies in that in the touch sensor 500, the extending pattern of the extending portion 532 is constituted by a plurality of line segments 532a disposed at intervals. In some embodiments, the line segments 532a may be disposed at intervals along the first direction D1. In other words, portions of the electrode line L can be exposed by the interval between the line segments 532a. In some embodiments, the line segments 532a can be disposed equidistantly at intervals along the first direction D1, and the line segments 532a located on different electrode lines L can be aligned with each other along the second direction D2. In this embodiment, the extending pattern constituted by a plurality of line segments 532a can also enable the extending portion 532 to reduce the possibility of optical interference. In addition, the details in configuration of each line segment 532a (e.g., the length of each line segment 532a, the distance between line segments 532a, etc.) can be flexibly adjusted according to actual needs, such that the resistance of the touch sensing electrode TE falls within the standard range, and that the RC loading value of the touch sensor 500 can be reduced.

Figure 6:
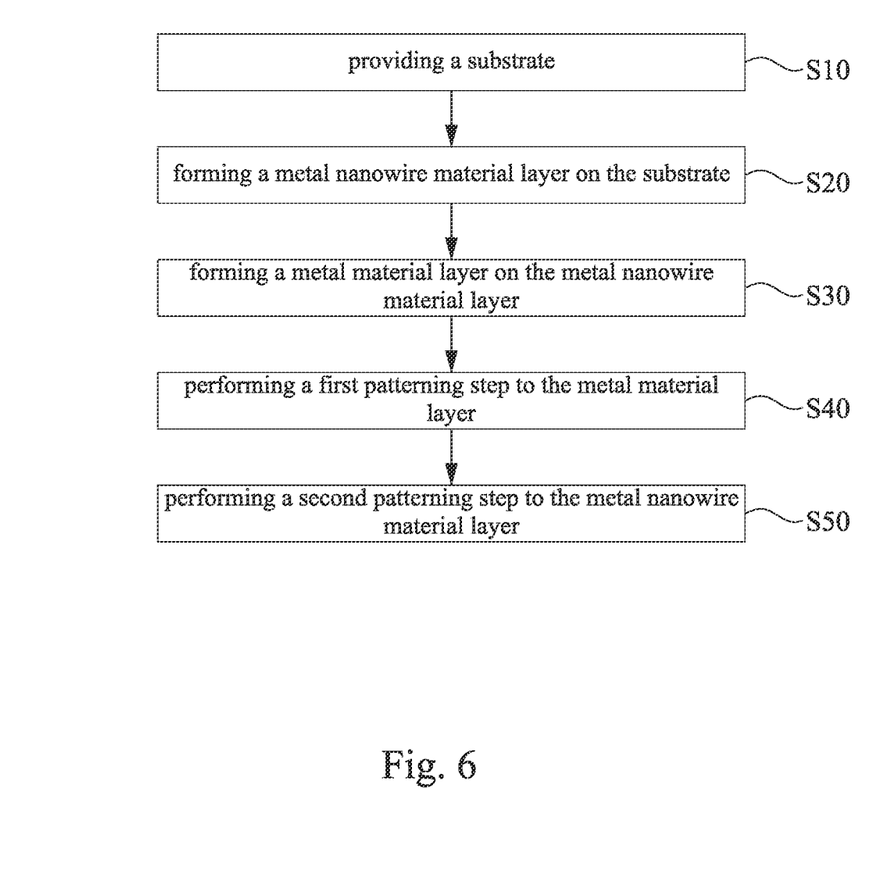
FIG. 6 is a flow chart illustrating a manufacturing method of a touch sensor.

It should be understood that the component connection relationships, materials, and advantages that have been described will not be repeated hereinafter. In the following descriptions, the touch sensor 100 in FIG. 1A to FIG. 10 will be taken as an example to further describe the manufacturing method of the touch sensor 100 of the present disclosure. Reference is made to FIG. 6, which is a flow chart illustrating a manufacturing method of a touch sensor 100. The manufacturing method of the touch sensor 100 includes step S10 to step S50, and step S10 to step S50 can be performed sequentially. In step S10, a substrate 110 is provided. In step S20, a metal nanowire material layer is formed on the substrate 110 and corresponding to the visible area VA and the peripheral area PA of the touch sensor 100. In step S30, a metal material layer is formed on the metal nanowire material layer. In step S40, a first patterning step is performed to the metal material layer, such that the metal material layer is formed into a metal layer 130 having an extending portion 132. In step S50, a second patterning step is performed to the metal nanowire material layer, such that the metal nanowire material layer is formed into a patterned metal nanowire layer 120, and the extending portion 132 of the metal layer 130 overlaps and contacts the metal nanowire layer 120 in the visible area VA. In the following descriptions, the above steps will be described in more detail.

Firstly, in steps S10 to S20, a substrate 110 is provided, and a metal nanowire material layer at least including a metal nanowire (e.g., a silver nanowire material layer, a gold nanowire material layer, or a copper nanowire material layer) is formed on the entire surface corresponding to the visible area VA and the peripheral area PA of the touch sensor 100. In some embodiments, post-treatments may be performed on the substrate 110, for example, a surface modification process is performed or an adhesive layer or a resin layer is additionally coated on the surface of the substrate 110 to enhance the adhesion between the substrate 110 and other layers. In some embodiments, a dispersion or slurry with metal nanowires may be formed on the substrate 110 by coating, and the dispersion or slurry is then cured or dried to make the metal nanowires adhere to the surface of the substrate 110. After the above curing or drying step, solvent and other substances in the dispersion or slurry will volatilize, and the metal nanowires can be randomly distributed on the surface of the substrate 110, or preferably, the metal nanowires can be fixed on surface of the substrate 110 without falling off to form the metal nanowire material layer. The metal nanowires in the metal nanowire material layer can contact each other to provide a continuous current path, so as to form a conductive network. That is, the metal nanowires contact each other at their intersection positions to form a path for transferring electrons.

In some embodiments, the dispersion or slurry includes a solvent, such that the metal nanowires are uniformly dispersed in the solvent. Specifically, the solvent is, for example, water, alcohols, ketones, ethers, hydrocarbons, aromatic solvents (benzene, toluene, xylene, etc.), or combinations thereof. In some embodiments, the dispersion may further include additives, surfactants, and/or binding agents to improve the compatibility between the metal nanowires and the solvent and the stability of the metal nanowires in the solvent. Specifically, the additives, surfactants, and/or binding agents may be, for example, carboxymethyl cellulose, hydroxyethyl cellulose, hypromellose, fluorosurfactant, sulfosuccinate sulfonate, sulfate, phosphate, disulfonate, or combinations thereof. The dispersion or slurry including the metal nanowires can be formed on the surface of the substrate 110 in any manner, such as but not limited to processes such as screen printing, spray coating, or roller coating. In some embodiments, a roll-to-roll process may be performed, such that the dispersion or slurry including the metal nanowires is coated on the surface of the substrate 110 supplied continuously.

In some embodiments, post-treatments may be further performed on the metal nanowires to improve the contact characteristics (e.g., increase the contact area) of the metal nanowires at their intersection positions, so as to enhance the conductivity. The post-treatments may include steps such as, but not limited to, heating, plasma providing, corona discharging, ultraviolet providing, ozone providing, or pressurizing. Specifically, after the metal nanowire material layer is formed by curing or drying, a roller may be used to apply pressure thereon. In some embodiments, one or more rollers may be used to apply pressure onto the metal nanowire material layer. In some embodiments, the applied pressure may be between about 50 psi and about 3400 psi, preferably between about 100 psi and about 1000 psi, between about 200 psi and about 800 psi, or between about 300 psi and about 500 psi. In some embodiments, the heating and pressurizing steps of the post-treatments can be performed on the metal nanowires at the same time. For example, a pressure of about 10 psi to about 500 psi (or preferably a pressure of about 40 psi to about 100 psi) can be applied through the roller, and the roller can be heated to about 70° C. to about 200° C. (or preferably about 100° C. to about 175° C.) to enhance the conductivity of the metal nanowires. In some embodiments, the metal nanowires may be exposed to a reducing agent for the post-treatment. For example, the metal nanowires including silver nanowires may preferably be exposed to a silver reducing agent for the post-treatment. In some embodiments, the silver reducing agent may include a borohydride such as sodium borohydride, a boron nitrogen compound such as dimethylamine borane, or a gas reducing agent such as hydrogen. In some embodiments, the exposure time may be between about 10 seconds and about 30 minutes, preferably between about 1 minute and about 10 minutes.

Next, in step S30, a metal material layer (e.g., a copper layer) including at least a highly conductive metal is formed on an entire surface of the metal nanowire material layer facing away from the substrate 110, such that the metal material layer covers the entire surface of the metal nanowire material layer. In other words, the metal material layer covers the metal nanowire material layer in the visible area VA and the peripheral area PA. In some embodiments, the metal material layer can be formed on the surface of the metal nanowire material layer by, for example, sputtering. After step S30 is performed, a stacked structure in which the substrate 110, the metal nanowire material layer, and the metal material layer sequentially stacked from bottom to top can be formed.

Subsequently, in step S40, a first patterning step is performed according to a first predetermined pattern, such that a portion of the metal material layer corresponding to the peripheral area PA and a portion of the metal material layer corresponding to the visible area VA are respectively defined with their patterns to form an integrally formed metal layer 130. In detail, the portion of the metal material layer corresponding to the peripheral area PA can be patterned to form a portion of the peripheral circuit T, and the portion of the metal material layer corresponding to the visible area VA can be patterned to form an extending portion 132 extending from the peripheral circuit T. In other words, the first patterning step is performed to form a portion of the metal layer 130 in the peripheral area PA, and to form another portion of the metal layer 130 (i.e., the extending portion 132) in the visible area VA, in which the extending portion 132 extends into the visible area VA from the portion of the metal layer 130 corresponding to the peripheral area PA, and no substantial interface is between the portion of the metal layer 130 corresponding to the peripheral area PA and the extending portion 132 of the metal layer 130. In some embodiments, the portion of the metal material layer corresponding to the peripheral area PA and the portion of the metal material layer corresponding to the visible area VA are patterned in a same process. That is, the portion of the metal layer 130 corresponding to the peripheral area PA and the extending portion 132 corresponding to the visible area VA can be formed in the same process. In some embodiments, the metal material layer can be patterned by etching, and the etching solution can be chosen to have the ability to etch the metal material layer without damaging the metal nanowire material layer. That is, the etching solution chosen can have a high etching selectivity for the metal material layer and the metal nanowire material layer to prevent the removal of the metal nanowire material layer under the metal material layer. In detail, when the metal material layer is a copper layer, the main component of the etching solution may be, for example, ammonium acetate, so as to etch the metal material layer separately without affecting the metal nanowire material layer therebelow. After step S40 is performed, the metal layer 130 can be formed, and the metal nanowire material layer below the metal layer 130 still exists on the substrate 110 in its entirety.

Then, in step S50, a second patterning step is performed according to a second predetermined pattern, such that a portion of the metal nanowire material layer corresponding to the visible area VA and a portion of the metal nanowire material layer corresponding to the peripheral area PA are respectively defined with their patterns to respectively form a first portion 120a and a second portion 120b of the metal nanowire layer 120 respectively corresponding to the visible area VA and the peripheral area PA, in which the second predetermined pattern is designed to be corresponding to the first predetermined pattern. In some embodiments, the portion of the metal nanowire material layer corresponding to the visible area VA can be patterned to form a touch sensing electrode TE. That is, the first portion 120a of the metal nanowire layer 120 can constitute the touch sensing electrode TE. In some embodiments, the touch sensing electrode TE can be formed by, for example, a plurality of electrode lines L disposed and connected in parallel. In addition, the electrode line L of the touch sensing electrode TE can be used to support the extending portion 132 of the metal layer 130. That is, the metal nanowire material layer directly under the extending portion 132 will not be removed, and a width W1 of the electrode line L along the second direction D2 can be patterned to be larger than a width W2 of the extending portion 132 along the second direction D2, so as to ensure that the extending portion 132 stably overlaps and contacts the electrode line L, thereby forming a stable electrical contact. In some embodiments, since the second predetermined pattern is corresponding to the first predetermined pattern, the patterning of the portion of the metal nanowire material layer corresponding to the visible area VA is performed corresponding to the position of the extending portion 132 of the metal layer 130. For example, the portion of the metal nanowire material layer corresponding to the visible area VA is patterned to form a touch sensing electrode TE constituted by a plurality of electrode lines L, and the position of each electrode line L along the first direction D1 is corresponding to the position of each of the extending portion 132 along the first direction D1. In some other embodiments, when the touch sensor 300 in FIG. 3 is taken as an example to pattern the metal nanowire layer 320, since the second predetermined pattern may be further designed to be conformal to the first predetermined pattern, the patterning of the portion of the metal nanowire material layer corresponding to the visible area VA is performed in conformal to the extending pattern of the extending portion 132 of the metal layer 130. For example, the portion of the metal nanowire material layer corresponding to the visible area VA can be patterned to form a touch sensing electrode TE constituted by a plurality of electrode lines L, and a contour of each electrode line L can be identical to a contour of the extending portion 132 overlapped therewith. Based on the above, the alignment between the electrode line L and the extending portion 132 can be well and efficiently achieved, thereby improving the convenience of patterning.

In some embodiments, the portion of the metal nanowire material layer corresponding to the peripheral area PA can be patterned to form a portion of the peripheral circuit T. That is, the second portion 120b of the metal nanowire layer 120 can form a portion of the peripheral circuit T. In detail, the portion of the metal nanowire material layer corresponding to the peripheral area PA can be patterned to completely overlap the portion of the metal layer 130 corresponding to the peripheral area PA. That is, the pattern of the second portion 120b of the metal nanowire layer 120 may be identical to the pattern of the portion of the metal layer 130 corresponding to the peripheral area PA, and the second portion 120b of the metal nanowire layer 120 and the portion of the metal layer 130 corresponding to the peripheral area PA together form the peripheral circuit T. In some embodiments, since the second portion 120b of the metal nanowire layer 120 and the portion of the metal layer 130 corresponding to the peripheral area PA have the same circuit pattern, the portion of the metal layer 130 corresponding to the peripheral area PA can serve as a mask to define the pattern of the second portion 120b of the metal nanowire layer 120 during the process of patterning the second portion 120b of the metal nanowire layer 120, such that some tedious mask alignment steps is omitted. In some embodiments, the first predetermined pattern and the second predetermined pattern can also be designed to have the same pattern in the peripheral area PA to realize the formation of the peripheral circuit T by the second portion 120b of the metal nanowire layer 120 and the metal layer 130. In some embodiments, the portion of the metal nanowire material layer corresponding to the peripheral area PA and the portion of the metal nanowire material layer corresponding to the visible area VA can be patterned in a same process. That is, the first portion 120a and the second portion 120b of the metal nanowire layer 120 can be formed in the same process. In some embodiments, the patterning of the metal nanowire material layer can be performed by etching, and the etching solution can be chosen to have the ability to etch the metal nanowire material layer without damaging the metal layer 130. That is, the etching solution chosen can have a high etching selectivity for the metal nanowire material layer and the metal layer 130 to prevent the damage to the formed metal layer 130. In more detail, when the metal nanowire in the metal nanowire material layer is a silver nanowire, and the material of the metal layer 130 is copper, the main components of the etching solution can be $H_3PO_4$ (with a volume ratio of about 55% to about 70% $H_3PO_4$ in the etching solution) and $HNO_3$ (with a volume ratio of about 5% to about 15% $HNO_3$ in the etching solution) to remove the silver material in the same process without damaging the formed metal layer 130. In other embodiments, the main component of the etching solution may be ferric chloride/nitric acid or phosphoric acid/hydrogen peroxide.

After the above steps, the touch sensor 100 shown in FIG. 1A can be formed. Generally, in the touch sensor 100, the metal layer 130 corresponding to the peripheral area PA has at least one extending portion 132 extending into the visible area VA, and the extending portion 132 overlaps and contacts the metal nanowire layer 120 corresponding to the visible area VA.

According to the aforementioned embodiments of the present disclosure, the touch sensor of the present disclosure has a metal layer located in the peripheral area, and since the metal layer has at least one extending portion extending into the visible area, and the extending portion overlaps and contacts the metal nanowire layer located in the visible area, the contact area between the metal layer and the metal nanowire layer can be effectively increased, which not only improves the electrical contact stability between the metal layer and the metal nanowire layer, but also effectively reduces the surface resistance of the touch sensor to improve the conductivity of the touch sensor, so as to reduce the resistive capacitive loading (RC Loading) of the touch sensor. In addition, a single process can be performed to the visible area and the peripheral area on the entire surface in the manufacturing method of the touch sensor, such that the entire metal nanowire material layer and the entire metal material layer are patterned. Accordingly, a peripheral circuit layered by the metal layer and the metal nanowire layer is formed in the peripheral area, and a touch sensing electrode with the metal layer assisted by the metal nanowire layer is formed in the visible area. As such, the conventional structural design which requires a single metal layer to align with the touch sensing electrode in the peripheral area can be omitted, and the alignment tolerance error generated during the overlapping process can be completely avoided, thereby meeting the design requirement for the product with narrow bezel.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:
1. A touch sensor having a visible area and a peripheral area on at least one side of the visible area, comprising:
    a substrate;

a metal nanowire layer disposed on the substrate and having a first portion corresponding to the visible area and a second portion corresponding to the peripheral area; and a metal layer disposed on the second portion of the metal nanowire layer and having at least one extending portion extending into the visible area, wherein:

the extending portion overlaps the first portion of the metal nanowire layer, the extending portion extends into the visible area from a boundary between the peripheral area and the visible area, and an extending length of the extending portion extending in the visible area is at least 0.05 mm.

2. The touch sensor of claim 1, wherein the extending portion extends along a first direction, a width of the extending portion along a second direction is between 0.006 mm and 0.050 mm, and the second direction is perpendicular to the first direction.

3. The touch sensor of claim 1, wherein the first portion of the metal nanowire layer constitutes at least one touch sensing electrode, the touch sensing electrode comprises at least one electrode line extending along a first direction, a width of the electrode line along a second direction is between 200 μm and 400 μm, and the second direction is perpendicular to the first direction.

4. The touch sensor of claim 3, wherein the extending portion extends above an entirety of the electrode line, the extending portion has two ends in the visible area along the first direction, the electrode line has two ends in the visible area along the first direction, and the two ends of the extending portion are substantially aligned with the two ends of the electrode line.

5. The touch sensor of claim 4, wherein an extending pattern of the extending portion is conformal to an electrode pattern of the electrode line.

6. The touch sensor of claim 4, wherein an extending pattern of the extending portion is a continuously extending linear pattern, wave pattern, or combinations thereof.

7. The touch sensor of claim 4, wherein an extending pattern of the extending portion is constituted by a plurality of line segments disposed at intervals.

8. The touch sensor of claim 3, wherein the metal layer has a plurality of the extending portions, the touch sensing electrode comprises a plurality of the electrode lines, and the extending portions are disposed corresponding to positions of the electrode lines, respectively.

9. The touch sensor of claim 1, wherein the second portion of the metal nanowire layer and the metal layer disposed on the second portion together constitute a peripheral circuit.

* * * * *